United States Patent [19]

Weil et al.

[11] Patent Number: 5,859,109

[45] Date of Patent: Jan. 12, 1999

[54] POLYOLEFIN COMPOSITION COMPRISING MAGNESIUM HYDROXIDE, MELAMINE AND NOVOLAC

[75] Inventors: Edward D. Weil, New York; Menachem Lewin, Brooklyn, both of N.Y.

[73] Assignee: J. M. Huber Corporation, Edison, N.J.

[21] Appl. No.: 74,790

[22] Filed: May 8, 1998

[51] Int. Cl.⁶ ...................................... C08K 3/10
[52] U.S. Cl. ........................... 524/436; 524/431; 524/432
[58] Field of Search ..................... 524/436, 431, 524/432

[56] References Cited

U.S. PATENT DOCUMENTS 5,482,985  1/1996  Baierweck et al. ..................... 524/436

FOREIGN PATENT DOCUMENTS

| 61-240507 | 10/1986 | Japan | 524/436 |
| 62-022304 | 1/1987  | Japan . | |
| 62-295937 | 12/1987 | Japan | 524/436 |
| 08073751  | 3/1996  | Japan . | |
| 08113717  | 5/1996  | Japan . | |

*Primary Examiner*—Bernard Lipman
*Assistant Examiner*—N. Sarofim
*Attorney, Agent, or Firm*—Carlos Nieves; Jeffrey S. Ginsberg

[57] ABSTRACT

A flame retardant polyolefin composition comprises at least about 25% by weight magnesium hydroxide and, preferably, at least about 30%, at least about 5% by weight melamine and, preferably, at least about 20%, and at least about 0.5% by weight novolac and, preferably at least about 1%.

15 Claims, No Drawings

POLYOLEFIN COMPOSITION COMPRISING MAGNESIUM HYDROXIDE, MELAMINE AND NOVOLAC

TECHNICAL FIELD

This invention relates to flame retardant polyolefin compositions and, more particularly, to such compositions which include magnesium hydroxide, melamine and novolac.

BACKGROUND OF THE INVENTION

Magnesium hydroxide is known to be a commercially useful non-halogen based flame retardant additive for polyolefins such as polypropylene. However, the shortcomings associated with the use of magnesium hydroxide are well established. For example, high additive loadings are required to reach desirable flame retardancy ratings such as UL-94 V-0 or even V-1 or V-2. Typically, magnesium hydroxide loadings in excess of 50% by weight are required, and to get the desirable UL-94 ratings of V-0 with sections of polyolefins as thin as 1/16", loadings as high as 65% are barely sufficient to provide requisite levels of flame retardancy. At such high loadings, the polyolefin composition tends to be stiff and brittle, especially if the polyolefin is polypropylene. At slightly lower levels of magnesium hydroxide, such as 60%, with thin sheets, UL 94 ratings of V-2 may not be attainable. As stated above, at higher additive loadings or with thicker sections, V-2, V-1, and V-0 ratings can be reached but the resulting magnesium hydroxide containing polyolefin compositions are too stiff and brittle.

The high density of magnesium hydroxide relative to polypropylene also leads to a heavy filled plastic, which is a disadvantage for many applications such as vehicle parts. Furthermore, the high loading of mineral filler also reduces the speed of processing and increases the wear on dies and molds.

SUMMARY OF THE INVENTION

The present invention is designed to overcome the deficiencies of the prior art discussed above. It is an object of the invention to provide a non-halogen based flame retardant additive for polyolefin compositions which contains lowered amounts of magnesium hydroxide and does not adversely affect the physical properties of such compositions.

In accordance with the illustrative embodiments and demonstrating features of the present invention, there is provided a flame retardant polyolefin composition which comprises at least about 25% by weight magnesium hydroxide and, preferably, at least about 30%, at least about 5% by weight melamine and, preferably, at least about 20%, and at least about 0.5% by weight novolac and, preferably at least about 1%.

Other objects, features, and advantages will be readily apparent from the following detailed description of preferred embodiments thereof.

DETAILED DESCRIPTION OF THE PREFERRED EMBODIMENTS

In accordance with the preceding summary, the present invention is directed toward polyolefin compositions which contain non-halogen based flame retardant additives that provide desirable levels of flame retardancy and which do not adversely affect the physical properties of the compositions. As more fully described below, the flame retardant additives of the present invention comprise effective amounts of magnesium hydroxide, novolac (novolak), and melamine. Such additives provide the polyolefin compositions with desirable levels of flame retardancy, produce self-extinguishment, prevent flaming drips, retard melt flow, and prevent sagging, even at temperatures substantially above the melting temperature of the polymeric compositions. High flammability ratings such as UL-94 V-0, with self-extinguishment, freedom from flaming drips and reduced melt flow are achieved with significantly lower amounts of the mineral filler and with improved physical properties than heretofore attainable.

There is substantial commercial demand for flame retardant polyolefins, particularly those compositions that are halogen free. Polyolefins, as defined herein, include polymers and copolymers of olefins such as ethylene, propylene, butenes, hexenes, and optionally with co-monomers such as vinyl acetate. Accordingly, polyethylene, ethylene-propylene copolymer, ethylene-propylene-diene modified copolymer, ethylene-hexene copolymer, and the like are included. Polyolefins such as polypropylene provide the greatest challenge to maintaining good physical properties in the presence of a high filler loading. As stated above, it has been found that the non-halogen based flame retardant additive described herein does not have an adverse impact on the physical properties of the polymeric composition and provides desirable levels of flame retardancy.

The magnesium hydroxide component of the present invention herein is available in both crystalline and amorphous forms or partially crystalline-partially amorphous forms. Further, a magnesium hydroxide of fine particle size, preferably having a Stokes equivalent particle diameter of less than 2.0 microns, is most useful with respect to minimizing adverse effects on the filled compound's physical properties. A highly preferred magnesium hydroxide having the requisite particle size properties is Zerogen™ 50 produced by J. M. Huber Corporation of Fairmont, Ga. As measured by the X-ray sedimentation particle size method Zerogen™ 50 has a Stokes equivalent particle size diameter of about 1.5 microns, while exhibiting a BET surface area value of about 3.5 $m^2/gm$. In the preferred embodiment, the magnesium hydroxide is surface treated with hydrophobicizing agents such as fatty acids and organosilanes. Effective levels of surface treatment are typically about 0.25 to about 3.0% by weight of the magnesium hydroxide. Small amounts of other metal oxides or hydroxides, such as iron, zinc, nickel or manganese oxides or hydroxides, are preferably added to the magnesium hydroxides. These metal oxides or hydroxides act as synergists.

The melamine component (2, 4, 6-triamino-1,3,5-triazine) of the additive is a white crystalline material that is insoluble in most organic solvents. While the use of melamine as a flame retardant is well established, such use has been heretofore ineffective in polypropylene compositions since loadings of up to 70% are often required to obtain the requisite levels of flame retardancy.

The phenolic resin novolac is also a component of the additive used in the polyolefin composition. While it has been known to use novolacs with magnesium hydroxide to make the mineral less hydrophilic, novolacs have not been heretofore recognized as usefull flame retardant contributors in a magnesium hydroxide-polyolefm composition. Further, the drip-preventative characteristic of the addition of specific amounts of novolacs has not been recognized in such compositions.

The novolacs utilized in the present invention are the acid-catalyzed condensation products of phenols with aldehydes. The phenol may be phenol itself, a cresol, a xylenol, a naphthol, an alkylphenol, and/or any other hydrocarbol substituted phenol. The aldehyde is most commonly formaldehyde but can be, by way of example and not limitation, acetaldehyde, butyraldehyde, crotonaldehyde or glyoxal. The degree of condensation should be at least about two phenol rings per mole so that the level of volatile components in the product is not too high. There is no upper limit on the degree of condensation except that the novolac should remain thermoplastic and at most only slightly cross-linked ("B-staged"). There is a lower limit of degree of condensation such that approximately less than 10% free monohydric phenol is present. A preferred class of novolacs are those with molecular weights of above about 1,000 and, more preferably, of about 10,000 or more.

The combination of magnesium hydroxide, melamine, and novolac results in a non-halogen based flame retardant system that, when added to a polyolefin composition such as polypropylene, provides the composition with desirable levels of flame retardancy (e.g., a UL-94 rating of V-0) without adversely affecting the physical properties of the same.

The addition of the melamine and novolac to the magnesium hydroxide, significantly reduces the amount of magnesium hydroxide that must be added to the polyolefin composition in order to achieve passable levels of flame retardancy. Furthermore, the presence of sufficient amounts of melamine provides a self-extinguishment characteristic and the presence of novolac retards propagation of the flame by flaming drips and also retards melt flow below the ignition temperature.

In the preferred embodiment, the polyolefin composition comprises: (1) at least about 25% by weight magnesium hydroxide and, preferably, at least about 30%; (2) at least about 5% by weight melamine and, preferably, at least about 20%, and (3) at least about 0.5% by weight novolac and, preferably at least about 1%.

In order to facilitate an understanding of the principles associated with the foregoing composition, the following examples, not intended to be limiting, are provided. The flame retardancy test utilized was a UL-94 vertical burning test. The detailed procedures of the UL 94 test are described in the bulletin entitled "Tests for Flammability of Plastic Materials for Parts in Devices and Appliances" by Underwriters Laboratories, Inc. In this test, a V-0 rating indicates the highest degree of flame retardancy, followed by V-1 and V-2 ratings. All three of these ratings are considered self-extinguishing and, therefore, are considered flame retardant or fire resistant.

EXAMPLES

| Example | Composition | LOI (Loss on Ignition) | UL-94 (1/16") | Comments |
|---|---|---|---|---|
| With no flame retardant: | | | | |
| 1 | Polypropylene | 18.2 | NC (not classifiable, sample ignites) | flaming drips |
| With only magnesium hydroxide: | | | | |
| 2 | 60% oleic acid treated Mg(OH)$_2$, 40% polypropylene | 26.0 | V-2 Av. ~8.8 sec. | flaming drips |
| 3 | 60% untreated Mg(OH)$_2$, 40% polypropylene | 26.7 | V-2, Av. ~8.8 sec. | flaming drips |
| With magnesium hydroxide and melamine: | | | | |
| 4 | 10% melamine, 50% oleic acid treated Mg(OH)$_2$, 40% polypropylene | 25.4 | V-2, Av. ~4.0 sec. | flaming drips |
| 5 | 20% melamine, 40% oleic acid treated Mg(OH)$_2$, 40% polypropylene | 25.0 | V-2, Av. ~10.3 sec. | flaming drips in second ignition |
| 6 | 30% melamine, 30% oleic acid treated Mg(OH)$_2$, 40% polypropylene | 26.6 | V-2, Av. ~3.9 | flaming drips |
| With novolac and magnesium hydroxide, without melamine: | | | | |
| 7 | 30% novolac, 30% oleic acid treated Mg(OH)$_2$, 40% polypropylene | 22.3 | NC | flaming drips |
| 8 | 0.5% novolac, 59.5% oleic acid treated Mg(OH)$_2$, 40% polypropylene | 25.9 | NC | only one flaming drip in first ignition |

-continued

| Example | Composition | LOI (Loss on Ignition) | UL-94 (1/16") | Comments |
|---|---|---|---|---|
| 9 | 3% novolac, 57% oleic acid treated Mg(OH)$_2$, 40% polypropylene | 26.8 | V-1, Av. ~6.6 sec. | no drips in both ignition |
| With novolac, melamine and magnesium hydroxide: | | | | |
| 10 | 15% melamine, 15% novolac (Durez 22091), 30% oleic acid treated Mg(OH)$_2$, 40% polypropylene | 24.5 | NC | no drips in both ignitions |
| 11 | 10% melamine, 10% novolac, 40% oleic treated Mg(OH)$_2$, 40% polypropylene | 25.4 | NC | no drips in both ignitions |
| 12 | 20% melamine, 10% novolac, 30% oleic treated Mg(OH)$_2$, 40% polypropylene | 24.2 | NC | no drips in both ignitions |
| 13 | 25% melamine, 5% novolac, 30% oleic treated Mg(OH)$_2$, 40% polypropylene | 25.6 | V-0, Av. 0.5 sec. | no drips in both ignitions |
| 14 | 5% melamine, 5% novolac, 50% oleic treated Mg(OH)$_2$, 40% polypropylene | 25.9 | V-1, Av. ~7.2 sec. | no drips in both ignitions |
| 15 | 29% melamine, 1% novolac, 30% oleic treated Mg(OH)$_2$, 40% polypropylene | 26.8 | NC | flaming drips |
| 16 | 25% melamine, 5% novolac (Durez 29295), 30% oleic treated Mg(OH)$_2$, 40% polypropylene | 26.8 | V-0, Av. ~0.4 sec. | flaming drips |
| 17 | 25% melamine, 1% novolac, 34% oleic treated Mg(OH)$_2$, 40% polypropylene | 25.2 | V-0, Av. ~3.7 sec. | no drips in both ignitions |
| 18 | 30% melamine, 3% novolac, 27% oleic treated Mg(OH)$_2$, 40% polypropylene | 26.4 | V-1, Av. ~14.1 sec. | no drips in both ignitions |
| 19 | 15% melamine, 5% novolac, 40% oleic treated Mg(OH)$_2$, 40% polypropylene | 23.6 | NC | no drips in both ignitions |
| 20 | 50% melamine, 5% novolac, 5% oleic treated Mg(OH)$_2$, 40% polypropylene | 20.9 | NC, Av. ~33.0 sec. | no drips in both ignitions |
| 21 | 5% novolac, 25% melamine, 30% oleic treated Mg(OH)$_2$, 40% polypropylene (novolac and Mg(OH)$_2$ mixed in ball mixer for 72 hrs and 125° C. oven heating for another 72 hrs in advance) | 25.6 | NC, Av. ~35.8 sec. | no drips in both ignitions |

-continued

| Example | Composition | LOI (Loss on Ignition) | UL-94 (1/16") | Comments |
| --- | --- | --- | --- | --- |
| 22 | 5% melamine, 5% novolac, 50% oleic treated Mg(OH)$_2$, 40% polypropylene | 25.6 | V-1, Av. ~6.8 sec. | no drips in both ignitions |
| 23 | 27% melamine, 3% novolac (Schenectady CRJ-418), 30% oleic treated Mg(OH)$_2$, 40% polypropylene | 26.7 | V-2, Av. ~19.6 sec. | flaming drips |
| 24 | 25% melamine, 5% novolac, 30% oleic treated Mg(OH)$_2$, 40% polypropylene | 25.1 | V-0, Av. ~0.8 sec. | no drips in both ignitions |

As set forth in examples 1–8, polyolefin compositions which contain either no flame retardant additives or magnesium hydroxide and/or melamine, are not sufficiently flame retardant (i.e., UL-94 ratings of V-0). Further, such compositions do not effectively retard the propagation of flame by flaming drips. Examples 9–24 demonstrate that a polyolefin composition which contains (1) magnesium hydroxide in an amount of from about 25% to about 50% by weight of the composition; (2) melamine in an amount of from about 5% to about 50% by weight of the composition, and (3) novolac in an amount of from about 0.5% to about 20% by weight of the composition is flame retardant or fire resistant.

In order to demonstrate the melt flow inhibition of the compositions of the present invention, polypropylene bars containing 30% magnesium hydroxide, 5% novolac (made form acid-catalyzed reaction of phenol and formaldehyde and having at least two phenol rings linked by a methylene group) and 25% melamine, and bars without novolac were heated side by side on a hot plate with a thermocouple between them. Around 200° C., the bar without novolac melted to a shapeless mass which contained a flow outward as the temperature was raised further. The bar with the novolac held its rectangular shape and its dimensions at temperatures of up to 300° C.

The present invention may be embodied in other specific forms without departing from the spirit or essential attributes thereof and accordingly reference should be made to the appended claims rather than to the foregoing specification as indicating the scope of the invention.

What is claimed is:

1. A flame retardant polyolefin composition comprising:
   at least about 30% by weight of a polyolefin;
   at least about 25% by weight magnesium hydroxide;
   at least about 5% by weight melamine, and
   at least about 0.5% by weight novolac.

2. The composition of claim 1 wherein said polyolefin is selected from the group consisting of a polyethylene, a polypropylene, a polyhexene, an ethylene-propylene copolymer, a polybutene, an ethylene-hexene copolymer, and an ethylene-vinyl acetate copolymer.

3. The composition of claim 1 wherein said magnesium hydroxide has a Stokes equivalent particle diameter of less than about 2.0 microns.

4. The composition of claim 1 wherein said magnesium hydroxide is surface treated with a hydrophobicizing agent.

5. The composition of claim 4 wherein said hydrophobicizing agent is selected from the group consisting of a fatty acid and an organosilane.

6. The composition of claim 4 wherein said hydrophobicizing agent is oleic acid.

7. The composition of claim 1 wherein the composition has a UL-94 flammability rating of V-0.

8. The composition of claim 1 wherein the composition comprises at least about 30% magnesium hydroxide by weight, at least about 20% melamine by weight, and at least about 1.0% novolac by weight.

9. The composition of claim 1 further including a metal oxide selected from the group consisting of iron oxide, zinc oxide, nickel oxide and manganese oxide.

10. The composition of claim 1 further including a metal hydroxide.

11. The composition of claim 1 wherein said magnesium hydroxide comprises less than 50% by weight of the composition.

12. The composition of claim 1 wherein said magnesium hydroxide comprises less than 50% by weight of the composition, said melamine comprises less than 50% by weight of the composition, and said novolac comprises less than 20% by weight of the composition.

13. The composition of claim 1 wherein said novolac has an average molecular weight above about 1,000.

14. The composition of claim 1 wherein said novolac has an average molecular weight above about 10,000.

15. The composition of claim 1 wherein said novolac is a condensation product of phenol with formaldehyde.

* * * * *